United States Patent
Diedrich et al.

[15] 3,676,415
[45] July 11, 1972

[54] PROCESS FOR POLYMERIZING α-OLEFINS

[72] Inventors: Bernd Diedrich; Karl Diether Keil; Kurt Rust, all of Frankfurt/Main, Germany

[73] Assignee: Farbwerke Hoechst Aktiengesellschaft Vormals Meister Lucius & Bruning, Frankfurt/Main, Germany

[22] Filed: June 25, 1969

[21] Appl. No.: 836,574

[30] Foreign Application Priority Data

June 27, 1968 Germany......................P 17 70 719.6
June 27, 1968 Germany......................P 17 70 730.1
June 27, 1968 Germany......................P 17 70 725.4
June 27, 1968 Germany......................P 17 70 716.3

[52] U.S. Cl..................260/88.2, 252/429 C, 260/94.9 DA, 260/94.9 E
[51] Int. Cl..........................C08f 1/56, C08f 3/06
[58] Field of Search.....................260/88.2, 94.9 E, 94.9 DA

[56] References Cited

UNITED STATES PATENTS

| 3,214,417 | 10/1965 | Bloyaert et al..........................260/93.7 |
| 3,400,110 | 9/1968 | Dassesse et al........................260/88.2 |

FOREIGN PATENTS OR APPLICATIONS

| 6,714,024 | 4/1968 | Netherlands |
| 1,560,467 | 2/1969 | France |

Primary Examiner—Joseph L. Schofer
Assistant Examiner—Edward J. Smith
Attorney—Connolly and Hutz

[57] ABSTRACT

The invention provides a process for homopolymerizing or copolymerizing ethylene in the presence of mixed catalysts comprising as component A the reaction products of specific tetravalent titanium compounds with halogen-free magnesium compounds containing 0.1 to 2 moles of OH groups per gram-atom of magnesium and as component B an organo-aluminum compound. Under a pressure below 20 atmospheres the yields are so high per unit of catalyst that the residues thereof need not be removed from the polymer. It is possible to produce polymers having a very narrow distribution of molecular weight and very good color and corrosion values.

8 Claims, No Drawings

PROCESS FOR POLYMERIZING α-OLEFINS

It is known to polymerize α-olefins and mixtures thereof by the Ziegler low pressure polymerization process. The catalysts used in this process are mixtures of compounds of the elements of sub-groups IV to VI of the Periodic Table according to Mendeleeff and organo-metal compounds of the elements of groups I to III of the Periodic Table. In general, the polymerization is carried out in suspension, in solution, or in the gaseous phase.

Processes have been proposed in which the catalyst components are used in combination with a carrier material. According to the process disclosed in French Pat. No. 1,198,422, the compounds of sub-groups IV to VI of the Periodic Table are mixed with carrier materials such as bentonite, pumice, kieselguhr, calcium phosphate or silica gel, and then reduced with organo-aluminum compounds. In this process the polymerization takes place independent of the type of carrier material used, only the composition of the catalyst fixed on the carrier material is of importance. A disadvantage of this method is, above all, the necessity to remove the catalyst and the carrier material before the polymers are further processed.

In other patent specifications it has been stated that a specific composition and nature of the carrier material is necessary to obtain a sufficient activity of the catalyst. In Belgian Pat. No. 609,261, for example, alkali earth metal phosphates are used which, prior to being reacted with titanium or vanadium compounds, must be heated at 200° to 1,000° C to obtain an activity that is sufficient for polymerization. In spite of this procedure the yield of polymer is very low. In Belgian Pat. No. 650,679 and French Pat. No. 1,448,320 hydroxychlorides of bivalent metals of the general formula Me(OH)Cl, preferably Mg(OH)Cl, are used as carrier materials for Ziegler catalysts. It is said that when the carrier is reacted with the transition metal component a chemical reaction takes place, for example, according to the following equation:

$$Cl-Mg-OH + TiCl_4 \rightarrow ClMg-O-TiCl_3 + HCl$$

Higher polymer yields can only be obtained when the polymerization is carried out under a pressure of about 20 atmospheres gauge. The process has the disadvantages that the preferably used Mg(OH)Cl must be prepared in rather complicated manner by very cautious stepwise dehydration of $MgCl_2 \cdot 6 H_2O$ at 285° C and that the carrier material used has a relatively high chlorine content.

In German Pat. No. 1,214,653 a process for the manufacture of catalysts supported on a carrier has been proposed according to which specific heavy metal compounds of the metals of groups IVa, Va, VIa, VIIa and VIII of the Periodic Table are allowed to act on pyrogenic metal oxides or non-metal oxides, preferably pyrogenic alumina, pyrogenic titanium dioxide or pyrogenic silica, which have the function of a carrier and the surfaces of which contain hydroxyl groups. The mean particle size of the carrier material should be less than about 0.1 micron and the concentration of hydroxyl groups should be so high that the hydroxyl groups react with at least $1 \times 10^{-4}$ equivalent of the transition metal per gram of carrier material.

Even if carried out under a pressure of 190 atmospheres gauge the polymerization gives such a low yield that a subsequent removal of catalyst and carrier material from the polymer is indispensable when an industrially useful product shall be produced.

Polymerizations according to the Ziegler process with catalysts supported on carriers can only be performed in simple manner when the polymer can be further processed without removal of catalyst and carrier. This is only possible if high polymer yields are obtained per catalyst unit and the polymer does not contain too high a proportion of chlorine which would involve coloration of the polymer and corrosion of the processing machines.

The present invention provides a process for polymerizing ethylene or mixtures of ethylene with up to 10 percent by weight, preferably up to 5 percent by weight, of α-olefins of the general formula $R-CH = CH_2$, in which R stands for a branched or straight-chain hydrocarbon radical having one to 13 carbon atoms, preferably one to eight carbon atoms, in solution, in suspension or in the gaseous phase at a temperature in the range of from 20° to 120° C, preferably 60° to 100° C, under a pressure of up to 20 atmospheres, preferably 1.5 to 8 atmospheres, in the presence of a mixed catalyst consisting of the reaction product of a titanium compound with an inorganic solid (component A) and an organo-aluminum compound (component B), optionally with regulation of the molecular weight by means of hydrogen, which comprises carrying out the polymerization in the presence of a mixed catalyst component A of which has been obtained by reacting tetravalent titanium compounds containing halogen atoms and alkoxy or aralkoxy groups with halogen-free magnesium compounds which contain 0.1 to 2 mols of hydroxyl groups per gram-atom of magnesium.

It is very surprising and could not be expected that the reaction products of the magnesium compounds with the titanium compounds used according to the invention represent highly active catalysts, the more so as in Belgian Pat. No. 650,679 it has expressly been stated that active catalysts cannot be obtained when instead of Me(OH)Cl as carrier other bivalent metal compounds containing hydroxyl groups, for example hydroxides, are used. Quite contrary thereto, the catalysts used according to the invention are considerably more active than catalysts with Mg(OH)Cl.

Component A of the catalyst used in the process of the invention is a reaction product of specific hydroxyl-groups-containing magnesium compounds with tetravalent titanium compounds containing halogen atoms and alkoxy groups or aralkoxy groups. For polymerization the unreacted magnesium compound is not removed from the reaction product. By the reaction of the magnesium compound with the titanium compounds used according to the invention the two compounds are firmly linked with one another and their structure changes. The process of the invention is, therefore, very different from processes using catalysts which are simply deposited on the carrier material or with which the carrier material is impregnated, as in neither case the chemical structure of the catalyst is changed by the carrier material.

Suitable tetravalent titanium compounds containing halogen atoms and alkoxy or aralkoxy groups are halo-titanic acid esters, preferably halo-ortho-titanic acid esters of the general formula $TiX_n(OR)_{4-n}$ in which $n$ is 1 to 3, X stands for chlorine and bromine and R represents identical or different hydrocarbon radicals, preferably alkyl radicals having one to 18, advantageously one to 10 carbon atoms. Especially good results are obtained with alkoxy titanates of the indicated formula in which $n$ is 1 to 2 and R stands for identical or different alkyl radicals having two to eight carbon atoms. There are mentioned by way of example $Ti(OC_2H_5)_2Cl_2$, $Ti(OC_2H_5)_3Cl$, $Ti(OC_3H_7)_2Cl_2$, $Ti(O\text{-iso } C_3H_7)_2Cl_2$, $Ti(OC_3H_7)_3Cl$, $Ti(O\text{-iso } C_3H_7)_3Cl$, $Ti(O\text{-iso } C_4H_9)_2Cl_2$ and $Ti(O\text{-iso } C_4H_9)_3Cl$.

In some cases it is advantageous to prepare the halo-ortho-titanic acid ester of the above formula in situ by reacting the corresponding ortho-titanic acid ester with $TiCl_4$ in appropriate proportions.

The reaction is preferably carried out at a temperature in the range of from 0° to 200° C, the upper temperature limit being given by the temperature of decomposition of the titanium compound used. Temperatures of from 20° to 120° C are preferred.

The reaction may be carried out in inert diluents, for example aliphatic, cycloaliphatic or aromatic hydrocarbons as generally used in low pressure polymerization, such as butane, pentane, hexane, heptane, cyclohexane, methylcyclohexane, as well as benzene or xylene. It is likewise possible to use gasoline fractions or fractions of hydrogenated Diesel oil which have been carefully freed from oxygen, sulfur compounds and moisture.

When the reaction is terminated the reaction product of the magnesium compound and the titanium compound which is insoluble in hydrocarbons is freed from unreacted titanium compound by repeatedly washing with one of the diluents specified above, in which the titanium compound is readily soluble.

As halogen-free magnesium compounds which should contain 0.1 to 2 and preferably 0.3 to 2 moles of hydroxyl groups per gram-atom of magnesium there are used, for example $Mg(OH)_2$ or magnesium compounds which contain carbonate, sulfate or carboxylate groups besides the hydroxyl groups. The said compounds are prepared in known manner.

$Mg(OH)_2$ can be obtained, for example, by reacting alkali metal or alkaline earth metal hydroxides such as KOH, NaOH, LiOH, $Ca(OH)_2$, $Sr(OH)_2$, $Ba(OH)_2$, with aqueous solutions of magnesium salts, for example $MgCl_2$, $MgSO_4$, $Mg(NO_3)_2$ with subsequent drying, for example by heating at a temperature of from 100° to 220° C, possibly under reduced pressure.

Magnesium compounds containing hydroxyl groups and carbonate groups can be obtained by adding solutions of carbonates, for example of soda or potash, to aqueous solutions of magnesium salts such as $MgCl_2$, $MGSO_4$, $MG(NO_3)_2$. It is likewise possible, however, to use mixtures of soda solutions and hydroxide solutions, for example sodium hydroxide solution.

The precipitates are washed and then substantially dehydrated and finely ground. Drying is suitably performed at a temperature from 180° to 300° C, preferably 190° to 250° C, possibly under reduced pressure. In this case it is advantageous to prepare magnesium compounds having a content of hydroxyl groups of 30 to 500 milligrams, preferably 50 to 400 milligrams per gram of magnesium compound, corresponding to 0.15 to 1.7 moles, preferably 0.25 1.5 moles of OH groups per gram-atom of magnesium.

Magnesium compounds containing hydroxyl groups and sulfate groups which can be obtained by an analogous reaction (cf. Gmelin Handbuch der anorganischen Chemie, System No. 27 B, 8th edition pages 276-278) are also substantially dehydrated by heating them at a temperature of from 180° to 300° C, preferably 190° to 250° C prior to being reacted with the titanium compounds.

It is likewise possible to use magnesium oxide/sulfate cements treated at 180° to 300° C, preferably 190° to 250° C which are obtained by allowing aqueous magnesium sulfate solutions to act on MgO. A molar ratio of MgO to $MgSO_4$ of 3:1 to 5:1 is then preferred.

To produce carriers that are particularly effective an aqueous $MgSO_4$ solution is reacted with $Mg(OH)_2$ at a temperature of from 20° to 100° C whereupon the water is evaporated and the reaction substantially dehydrated. It is expedient to perform this procedure in stages by first heating the reaction product at 100° to 120° C, finely grinding it and then heating it at a temperature of from 180° to 300° C, preferably 190° to 250° C. The molar ratio of hydroxyl groups to sulfate groups can vary within wide limits, a ratio of from 1:1 to 20:1 and advantageously 4:1 to 10:1 being preferred. Consequently, the ratio of hydroxyl groups to magnesium is in the range of from 0.7 to 1.9, preferably 1.3 to 1.7.

The magnesium compounds containing hydroxyl groups and carboxylate groups are also prepared in known manner, for example by reacting $Mg(OH)_2$ with carboxylic acids, for example in the form of aqueous solutions. Alternatively, aqueous magnesium carboxylate solutions, for example a solution of magnesium acetate, can be stirred with MgO. The initially plastic paste solidifies after some time to a cement-like mass which is dried at a temperature of from 130° to 150° C, preferably 132° to 135° C and then finely ground.

Suitable carboxylic acids that can be used for making the magnesium compounds containing hydroxyl groups and carboxylate groups are monobasic or polybasic, saturated or unsaturated, substituted or unsubstituted carboxylic acids or mixtures thereof, for example mixtures of aliphatic carboxylic acids such as obtained in the paraffin oxidation, acrylic acid, methacrylic acid oleic acid, stearic acid, mixtures of carboxylic acids as formed in the saponification of fats, as well as maleic acid, fumaric acid, terephthalic acid, isophthalic acid, trimellitic acid. There are preferably used monobasic carboxylic acids of the formula $RCO_2H$ in which R stands for a branched or straight-chain alkyl or aralkyl radical having one to 10 carbon atoms or an aryl radical. There may also be used dibasic saturated carboxylic acids such as oxalic acid or acids of the formula HOOC—R—COOH in which R stands for an unsubstituted or substituted alkyl radical having one to 10 carbon atoms, for example butyric acid, caproic acid, cyclohexane-carboxylic acid, benzoic acid, succinic acid, adipic acid; acetic acid, propionic acid and oxalic acid being preferred.

The molar ratio of hydroxyl groups to carboxylate groups in the magnesium compounds to be used according to the invention can vary within wide limits, advantageously in the range of from 10:1 to 1:2, and more advantageously from 5:1 to 1:1 corresponding to 0.6 to 1.8 and preferably 1.0 to 1.7 moles of OH groups per gram-atom of magnesium.

The aforesaid magnesium compounds should expediently be used with an average particle size of 0.1 to 150 microns, preferably 1 to 100 microns.

Component A of the catalyst preferably contains 0.05 to 10 mg-atom and more preferably 1 to 10 mg-atom of titanium per gram of component A. The titanium content can be varied by the time of reaction, the temperature of reaction and the concentration of the titanium compound used.

The concentration of the titanium component fixed on the magnesium compound is advantageously within the range of from 0.005 to 1.5, preferably from 0.03 to 0.8 mmols, per liter of dispersing agent or reactor volume. Generally, even higher concentrations are possible.

Prior to being reacted with the titanium compound the magnesium hydroxide may be reacted with other inert inorganic solids that do not inhibit the polymerization. Solids of this type are metal compounds such as oxides, hydroxides, halides, sulfates, carbonates, phosphates, silicates, more particularly alkaline earth metal oxides, for example CaO, $Al(OH)_3$, fluorides and chlorides, for example $MgF_2$, $AlCl_3$, $ZnCl_2$, alkaline earth metal carbonates such as $BaCO_3$, alkaline earth metal phosphates, for example $Ca_3(PO_4)_2$, apatite, or talc.

The molar ratio of magnesium compound to inorganic solid is not critical and may vary within wide limits, a range of from 1:0.5 to 1:0.9 and more particularly 1:0.08 to 1:0.5 being preferred.

When, for example $ZnCl_2$ is added to the magnesium compound, a catalyst is obtained which has a distinctly improved reactivity with respect to $H_2$ and is, therefore, suitable for the manufacture of polymers having low molecular weights.

The tetravalent titanium compound in component A is suitably transformed into the polymerization-active compound having a lower valence during the course of polymerization by adding the organo-aluminum compound (component B) at a temperature of from 20° to 120° C, preferably 60° to 100° C.

It is likewise possible, however, to treat component A with the organo-aluminum compound prior to polymerization at a temperature of from −30° to 100° C, preferably 0° to 20° C. When chlorine-containing organo-aluminum compounds are used, it is advantageous to wash the reaction product obtained. It is then activated with the organo-aluminum compound at a temperature of from 20° to 120° C, preferably 60° to 100° C.

Suitable organo-aluminum compounds are the reaction products of aluminum trialkyls or dialkyl aluminum hydrides with hydrocarbon radicals having one to 16 carbon atoms, preferably $Al(isobutyl)_3$ or $Al(isobutyl)_2H$ and diolefins containing four to 20 carbon atoms, preferably isoprene, for example aluminum isoprenyl.

As component B there may also be used chlorine-containing organo-aluminum compounds, for example dialkyl-aluminum monochlorides of the formula $R_2AlCl$ or alkyl-aluminum sesquichlorides of the formula $R_3Al_2Cl_3$ in which R stands for identical or different hydrocarbon radicals, preferably alkyl radicals having one to 16, advantageously two to 12 carbon atoms, for example $(C_2H_5)_2AlCl$, $(iso\ C_4H_9)_2AlCl$ or $(C_2H_5)_3Al_2Cl_3$.

As component B there are preferably used aluminum trialkyls of the formula AlR$_3$ or dialkyl aluminum hydrides of the formula AlR$_2$H in which R stands for identical or different hydrocarbon radicals, preferably alkyl radicals having one to 16 and advantageously two to six carbon atoms, such as Al(C$_2$H$_5$B$_3$ Al(C$_2$H$_5$)$_2$H, Al(C$_3$H$_7$)$_3$, Al(C$_3$H$_7$)$_2$H, Al(iso C$_4$H$_9$)$_3$ or Al(iso C$_4$H$_9$)$_2$H.

The organo-aluminum activator can be used in a concentration of from 0.5 to 10 millimoles, preferably 2 to 4 millimoles per liter of dispersion medium, or per liter of reactor volume.

The polymerization is carried out in solution, in suspension or in the gaseous phase either continuously or discontinuously at a temperature in the range of from 20° to 120° C, preferably 60° to 100° C under a pressure of up to 20 atmospheres, preferably 1.5 to 8 atmospheres.

The polymerization in suspension is carried out in the inert diluents generally used for Ziegler low pressure polymerizations as defined above for the preparation of component A of the catalyst.

Olefins that can be polymerized by the process of the invention are ethylene or mixtures of ethylene with up to 10 % by weight, preferably up to 5 % by weight of α-olefins of the general formula R—CH = CH$_2$ in which R stands for a branched or straight-chain hydrocarbon radical, preferably an alkyl radical, with one to 13 and preferably one to eight carbon atoms. Olefines of this type are preferably propylene, butene-(1), pentene-(1) and 4-methyl-pentene-(1).

The molecular weight of the polymers can be regulated in known manner by adding suitable regulators, preferably hydrogen. The important industrial progress of the process of the invention over the process of Belgian Pat. No. 650,679 and French Pat. No. 1,448,320 resides in the fact that the polymerization is more simple to carry out as high polymer yields are obtained per unit of catalyst in a pressure range of from 4 to 9 atmospheres so that the catalyst may remain in the polymer.

Hence, in the case of polymerization in suspension complicated operations may be dispensed with, such as decomposition of the catalyst, removal of catalyst and carrier material and the like. After filtration to remove the dispersion medium the polymer is dried and directly further processed without additional treatment. The very low amounts of catalyst and carrier in the polymer do neither discolor the polymer nor corrode the processing machines.

As compared therewith, in the known processes considerably lower yields are obtained per gram of MgOHCl on which the TiCl$_4$ is fixed even under a pressure of 20 atmospheres gauge, for example at most 1.5 kilograms of polymer per gram of MgOHCl, whereas the process of the invention yields under a pressure of 5 to 9 atmospheres 3 to 25 kilograms of polymer per gram of magnesium compound used, on which, for example Ti(O-isoC$_3$H$_7$)$_2$Cl$_2$, is fixed.

A further advantage of the process of the invention is that the magnesium compounds used can be more readily obtained than MgOHCl which must be prepared by very careful gradual dehydration of MgCl$_2$ × 6 H$_2$0 at 285° C.

Moreover, the carriers of the invention do not contain chlorine as is the case with MgOHCl so that the polymers obtained by the process of the invention have much better corrosion values with the same content of carrier material.

With the preferred use of chloroalkoxytitanates (IV) of the formula TiCl$_n$(OR)$_{4-n}$ in which $n$ is 1 to 2 and R stands for identical or different alkyl radicals having two to eight carbon atoms, polymers are obtained with a very narrow distribution of the molecular weight and interesting utilitarian properties the Mw/Mn values being in the range of from 2 to 6.

The polymers obtained by the process of the invention have excellent color values and corrosion properties and are especially suitable for the manufacture of injection moulded articles.

The following Examples serve to illustrate the invention but they are not intended to limit it thereto.

EXAMPLE 1

I. Preparation of Catalyst

82 Grams of Mg(OH)$_2$, which had been heated for 5 hours at 200° C, were boiled for 7 hours with reflux, while stirring in a nitrogen atmosphere with 1,400 milliliters of a 1 molar solution of TiCl$_2$(O-isoC$_3$H$_7$)$_2$ in cyclohexane. The precipitate was washed by decanting and stirring ten times, each time with 500 milliliters of cyclohexane until the cyclohexane above the precipitate was free from unreacted titanium compound. The volume of the suspension was then made up to 1,000 milliliters.

The titanium content of the suspension was determined colorimetrically with hydrogen peroxide (cf. G.O Müller Praktikum der quantitativen chemischen Analyse, 4th edition (1957), page 243). 10 Milliliters of the suspension contained 4.1 millimoles of titanium compound.

II. Polymerization of Ethylene a. 100 Liters of Diesel oil having a boiling range of from 140° to 200° C were introduced into a vessel having a capacity of 150 liters, the air in the vessel was replaced by pure nitrogen and the contents of the vessel were heated at 80° to 85° C. Next a solution of 54 grams (400 millimoles) of aluminum triethyl in 500 milliliters of Diesel oil and 80 milliliters of the catalyst suspension were added. Polymerization was carried out at a temperature of 85° C. 6 Kilograms of ethylene were introduced per hour and an amount of hydrogen such that the gaseous phase contained 30 % by volume thereof. During the course of polymerization the pressure rose to about 7 atmospheres. After 7 hours the polyethylene formed was separated from the dispersion medium by filtration and dried. 42 Kilograms of polyethylene were obtained having a reduced specific viscosity of 1.8, determined with a 0.1 % solution in decahydronaphthalene at 135° C. The yield was about 8 kilograms of polyethylene for each gram of Mg(OH)$_2$ used. A polyethylene was obtained having a very narrow molecular weight distribution (Mw/Mn = 4.0). The value of molecular weight (weight average)/molecular weight (number average) was determined by the fractionation data of the gel permeation chromatograph of Messrs. Waters (USA) in 1,2,4-trichlorobenzene as solvent and elution agent at 130° C.

The polymer had excellent color values and corrosion properties and could be well processed by injection moulding.

b. Comparative experiment

Under the conditions indicated sub I a catalyst was prepared from 82 grams of MgOHCl (prepared as described in French Pat. No. 1,448,320) and 1,400 milliliters of a 1 molar solution of TiCl$_2$(O-isoC$_3$H$_7$)$_2$ in cyclohexane. With 80 milliliters of the suspension of the catalyst polyethylene was produced under the conditions indicated sub IIa. Under a polymerization pressure of 7 atmospheres only 16 kilograms of polyethylene were obtained after 7 hours.

EXAMPLE 2

Copolymerization of Ethylene with Butene.

100 Liters of Diesel oil having a boiling point of from 140° to 200° C were introduced into a 150 liter vessel, the air in the vessel was replaced by pure nitrogen and the contents of the vessel were heated at 80° to 85° C. A solution of 79.2 grams (400 millimoles) of aluminum triisobutyl in 500 milliliters of Diesel oil and 70milliliters of the catalyst suspension of Example 1, I were added. The polymerization was carried out at 85° C. 6 Kilograms of ethylene and 180 grams of butene-(1) were introduced per hour together with hydrogen in an amount such that the gaseous phase contained 20 % by volume thereof. During the course of polymerization the pressure rose to about 7 atmospheres. After 7 hours the ethylene-butene copolymer was separated from the dispersion medium by filtration and dried. About 43 kilograms of an ethylene-butene copolymer having a reduced specific viscosity of 2.5, determined with a 0.1 % solution in decahydronaphthalene at 135° C and a density of 0.932 g/cc were obtained. The polymer had excellent color and corrosion values. About 11 kilograms of copolymer were obtained for each gram of Mg(OH)$_2$ used.

EXAMPLE 3 a. Preparation of Catalyst

82 Grams of Mg(OH)$_2$, which had been heated for 5 hours at 200° C, were boiled with reflux for 24 hours, while stirring in a nitrogen atmosphere, with 1,000 milliliters of a 1 molar solution of TiCl(O-isoC$_3$H$_7$)$_3$ in cyclohexane. The precipitate was washed by decanting and stirring 10 times, each time with 500 milliliters of cyclohexane until the cyclohexane above the precipitate was free from unreacted titanium compound. The volume of the suspension was made up to 1,000 milliliters and the titanium content was determined colorimetrically with hydrogen peroxide. 10 milliliters of suspension contained 0.36 millimole of titanium compound.

b. Polymerization of Ethylene 100 liters of Diesel oil having a boiling range of from 140° to 200° C were introduced into a 150 liter vessel, the air in the vessel was replaced by pure nitrogen and the contents of the vessel were heated at 80° to 85° C. A solution of 68.8 grams (800 millimoles) of diethyl aluminum hydride in 500 milliliters of Diesel oil and 300 milliliters of the catalyst suspension were added. The polymerization was carried out at 85° C. 5 Kilograms of ethylene were introduced per hour and an amount of hydrogen such that the gaseous phase contained 25 % by volume thereof. In the course of polymerization the pressure rose to about 8 atmospheres. After 7 hours the polyethylene formed was separated from the dispersion medium by filtration. About 35 kilograms of polyethylene having a reduced specific viscosity of 2.4, determined with a 0.1 % solution in decahydronaphthalene at 135° C, were obtained. The polymer had excellent color and corrosion values. The yield amounted to 1.2 kilograms per gram of Mg(OH)$_2$.

EXAMPLE 4

I. Preparation of Catalyst

A. 27 Grams of ZnCl$_2$ were dissolved in 100 milliliters of water and stirred in portions with 34 grams of Mg(OH)$_2$. The suspension was evaporated to dryness on the water bath, the residue was dried at 120° C and finely ground. The ground product was heated at 200° C.

B. 20 Grams of the product obtained were boiled for 7 hours with reflux while stirring in a nitrogen atmosphere with 280 milliliters of a 1 molar solution of TiCl$_2$(O-isoC$_3$H$_7$)$_2$ in cyclohexane. The precipitate was washed by decanting and stirring 10 times, each time with 150 milliliters of cyclohexane until the cyclohexane above the precipitate was free from unreacted titanium compound. The volume of the suspension was then made up to 280 milliliters.

The titanium content of the suspension was determined colorimetrically with hydrogen peroxide. 10 Milliliters of suspension contained 2.2 millimoles of titanium compound.

II. Polymerization of Ethylene

100 Liters of Diesel oil boiling at a temperature in the range of from 140° to 200° C were introduced into a 150 liter vessel, the air in the vessel was replaced by pure nitrogen and the Diesel oil was heated at 80° to 85° C. A solution of 34.4 grams (400 millimoles) of diethylaluminum hydride in 500 milliliters of Diesel oil and 100 milliliters of the catalyst suspension were added. Polymerization was carried out at 85° C. 5 Kilograms of ethylene were introduced per hour and an amount of hydrogen such that the proportion thereof in the gaseous phase amounted to 30 % by volume. In the course of polymerization the pressure rose to about 8 atmospheres. After 7 hours the polyethylene formed was separated from the dispersion medium by filtration and dried. 35 Kilograms of polyethylene having a reduced specific viscosity of 0.9, determined with a 0.1 % solution in decahydronaphthalene at 135° C, were obtained.

EXAMPLE 5

Polymerization of Ethylene in the Gaseous Phase.

500 Grams of polyethylene having a reduced specific viscosity of 1.5 and an apparent density of 450 g/l were introduced into a horizontal 10 liter reactor provided with stirrer the stirring means of which scraped along the inner walls. The air in the reactor was removed by repeated evacuation and scavenging for several hours with a mixture of ethylene and hydrogen. The temperature was raised to 83° C and 5.7 grams of Al(C$_2$H$_5$)$_3$ (50 millimoles) and 17 milliliters of the catalyst suspension of Example 1 I were added.

400 Grams of ethylene were introduced per hour and hydrogen in such an amount that during polymerization the proportion of hydrogen in the reactor was always 30 % by volume. During the course of polymerization the pressure rose to about 9 atmospheres. After 12 hours about 5.2 kilograms of polyethylene were obtained having a reduced specific viscosity of 1.9, determined with a 0.1 % solution in decahydronaphthalene at 135° C. The yield of polymer amounted at 5.2 kilograms per gram of Mg(OH)$_2$.

EXAMPLE 6 a. Reaction of the Supported Catalyst with Ethylaluminum Sesquichloride.

With exclusion of air and moisture a solution of 100 millimoles of Al$_2$(C$_2$H$_5$)$_3$Cl$_3$ (24.7 grams) in 250 milliliters of Diesel oil were dropped at 0° C over a period of 2 hours into 100 milliliters of the catalyst suspension according to Example 1 I and the mixture was further stirred for 2 hours at 20° C. A bluish black precipitate was formed which was washed 4 times, each time with 300 milliliters of Diesel oil. The volume of the suspension was made up to 100 milliliters.

b. Polymerization of Ethylene/Propylene 100 liters of Diesel oil having a boiling temperature in the range of from 140° to 200° C were introduced into a 150 liter vessel and the air in the vessel was replaced by pure nitrogen. The Diesel oil was heated at 80° to 85° C. and a solution of 54 grams (400 millimoles) of aluminum triethyl in 500 milliliters of Diesel oil and 40 milliliters of the suspension of the reduced catalyst obtained as described above were added. Polymerization was carried out at 85° C. 6 Kilograms of ethylene and 150 grams of propylene were introduced per hour together with hydrogen in an amount such that the proportion thereof in the gaseous phase was 20 % by volume. During the course of polymerization the pressure rose to about 7 atmospheres.

After 7 hours the polymer was separated from the dispersion medium by filtration and dried. About 43 kilograms of an ethylene/propylene copolymer having a reduced specific viscosity of 3.4, determined with a 0.1 % solution in decahydronaphthalene at 135° C, and a density of 0.936 g/cc were obtained. The product had excellent color and corrosion values.

EXAMPLE 7 a. Preparation of Catalyst

100 Grams of magnesium hydroxide/carbonate of the heavy type of Messrs. Merk AG. Germany were boiled for 10 hours with reflux while stirring in a nitrogen atmosphere with 1,500 milliliters of a 1 molar solution of TiCl$_2$(O-isoC$_3$H$_7$)$_2$ in cyclohexane. The precipitate was washed by decanting and stirring 10 times, each time with 500 milliliters of cyclohexane until the cyclohexane above the precipitate was free from titanium compound. The volume of the suspension was made up to 1,500 milliliters.

The titanium content of the suspension was determined colorimetrically with hydrogen peroxide. 10 Milliliters of the suspension contained 2.4 millimoles of titanium compound.

b. Polymerization of Ethylene

100 Liters of Diesel oil having a boiling point in the range of from 140° to 200° C were introduced into a 150 liter vessel, the air in the vessel was replaced by pure nitrogen and the Diesel oil was heated at 80° to 85° C. A solution of 54 grams (400 millimoles) of triethyl-aluminum in 500 milliliters of Diesel oil and 120 milliliters of the catalyst suspension prepared as described above were added. The polymerization was carried out at 85° C. 6 Kilograms of ethylene were introduced per hour and hydrogen in an amount such that the proportion thereof in the gaseous phase was 30 % by volume. During the course of polymerization the pressure rose to about 7 atmospheres. After 7 hours the polyethylene formed was separated from the dispersion medium by filtration and dried. About 42 kilograms of polyethylene were obtained having a reduced specific viscosity of 1.9, determined with a 0.1 % solution in decahydronaphthalene at 135° C. The yield of polymer amounted to about 6 kilograms per gram of magnesium hydroxide carbonate.

The polyethylene obtained had a very narrow distribution of molecular weight (Mw/Mn = 3.6), excellent color and corrosion values and could be well processed by injection moulding.

EXAMPLE 8

Copolymerization of Ethylene with Butene

100 Liters of Diesel oil boiling at a temperature in the range of from 140° to 200° C were introduced into a 150 liter vessel and the air in the vessel was replaced by pure nitrogen. The Diesel oil was heated at 80°–85° C and a solution of 79.2 grams (400 millimoles) aluminum-triisobutyl in 500 milliliters of Diesel oil and 100 ml of the catalyst suspension obtained as described in Example 7a were added. The polymerization was carried out at 85° C. 6 Kilograms of ethylene and 180 grams of butene-(1) were introduced per hour together with hydrogen in an amount such that the proportion thereof in the gaseous phase amounted to 20 % by volume. During the course of polymerization the pressure rose to 7 atmospheres. After 7 hours the ethylene/butene copolymer formed was separated from the dispersion medium by filtration and dried. About 43 kilograms of an ethylene/butyene copolymer having a reduced specific viscosity of 2.6, determined with a 0.1 % solution in decahydronaphthalene at 135° C, and a density of 0.932 g/cc were obtained. The product had excellent color and corrosion values. The yield amounted to about 7 kilograms of copolymer per gram of magnesium hydroxide/carbonate.

EXAMPLE 9

I. Preparation of Catalyst a. 305 Grams of $MgCl_2.6\ H_2O$ were dissolved in 1500 milliliters of water and while stirring an aqueous solution of 90 grams of NaOH and 40 grams of $Na_2CO_3$ in 500 milliliters of water was added. The precipitate formed was filtered off with suction and thoroughly washed. Next, it was heated for 10 hours at 200° C and then ground.

b. 50 Grams of the compound obtained were boiled for 12 hours with reflux while stirring in a nitrogen atmosphere with 500 milliliters of a 1 molar solution of $TiCl_2(O\text{-}isoC_3H_7)_2$ in cyclohexane. The precipitate was washed by decanting and stirring 10 times, each time with 250 milliliters of cyclohexane until the cyclohexane above the precipitate was free from titanium compound. The volume of the suspension was made up to 500 milliliters. The titanium content of the suspension was determined colorimetrically with hydrogen peroxide. 10 Milliliters of suspension contained 1.8 millimoles of titanium compound.

II. Polymerization of Ethylene

100 Liters of Diesel oil boiling at a temperature in the range of from 140° to 200° C were introduced into a 150 liter vessel, the air in the vessel was replaced by pure nitrogen and the Diesel oil was heated at 80° to 85° C. A solution of 51.6 grams (600 millimoles) of diethyl-aluminum hydride in 500 milliliters of Diesel oil and 120 milliliters of the catalyst suspension obtained as described above were added. The polymerization was carried out at 85° C. 6 Kilograms of ethylene were introduced per hour together with hydrogen in an amount such that the gaseous phase contained 25 % by volume thereof. During the course of polymerization the pressure rose to about 8 atmospheres. After 7 hours the polyethylene formed was separated from the dispersion medium by filtration and dried. About 42 kilograms of polyethylene having a reduced specific viscosity of 2.4, determined with a 0.1 % solution in decahydronaphthalene at 135° C, were obtained. The product had excellent color and corrosion values. About 3.5 kilograms of polyethylene were obtained per gram of magnesium compound containing hydroxyl and carbonate groups.

EXAMPLE 10 a. Reaction of the Supported Catalyst with Ethyl-aluminum Sesquichloride.

With the exclusion of air and moisture a solution of 50 millimoles of $Al_2(C_2H_5)_3Cl_3$ (12.4 grams) in 250 milliliters of Diesel oil were dropped at 0° C over a period of 2 hours to 100 milliliters of the catalyst suspension prepared as described in Example 7a and the mixture was stirred for another 2 hours at 20° C. A bluish black precipitate was formed which was washed 4 times, each time with 300 milliliters of Diesel oil. The volume of the suspension was made up to 100 milliliters.

b. Polymerization of Ethylene/Propylene.

100 Liters of Diesel oil boiling at a temperature in the range of from 140° to 200° C were introduced into a 150 liter vessel, the air in the vessel was replaced by pure nitrogen and the Diesel oil was heated at 80°–85° C. A solution of 54 grams (400 millimoles) of triethyl-aluminum in 500 milliliters of Diesel oil and 40 milliliters of the suspension of the reduced catalyst prepared as described above were added. The polymerization was carried out at 85° C. 6 Kilograms of ethylene and 150 grams of propylene were introduced per hour together with hydrogen in an amount such that the gaseous phase contained 20 % by volume thereof. During the course of polymerization the pressure rose to 7 atmospheres.

After 7 hours the polymer formed was separated from the dispersion medium by filtration and dried. About 43 kilograms of an ethylene/propylene copolymer having a reduced specific viscosity of 3.4, determined with a 0.1 % solution in decahydronaphthalene at 135° C and a density of 0.935 g/cc were obtained. The product had excellent color and corrosion properties.

EXAMPLE 11

A horizontal reactor having a capacity of 10 liters provided with stirrer the stirring means of which scraped along the inner wall was charged with 500 grams of polyethylene having a reduced specific viscosity of 3.8 and an apparent density of 450 grams/liter. The air in the reactor was removed by repeated evacuation and scavenging for several hours with a mixture of ethylene and hydrogen. The reactor was then heated at 85° C and 5.7 grams (50 millimoles) of $Al(C_2H_5)_3$ and 8 ml of the catalyst suspension of Example 9 were added.

400 Grams of ethylene were introduced per hour and hydrogen in an amount such that during polymerization the proportion thereof amounted to 15 % by volume. During the course of polymerization the pressure rose to about 9 atmospheres. Polymerization was interrupted after 12 hours. About 5.2 kilograms of polyethylene were obtained having a reduced specific viscosity of 2.8, determined with a 0.1 % solution in decahydronaphthalene at 135° C. The yield of polyethylene was about 6 kilograms per gram of magnesium compound containing hydroxyl groups and carbonate groups.

EXAMPLE 12

I. Preparation of Catalyst a. 123 Grams of $MgSO_4$ . 7 $H_2O$ were dissolved in 300 milliliters of water and stirred in portions with 87.5 grams of $Mg(OH)_2$. The reaction product was evaporated to dryness on the water bath, dried at 100° C in a drying cabinet and finely ground. The ground reaction product was then heated at 220° C.

b. 100 Grams of the magnesium compound thus obtained were boiled for 12 hours with reflux while stirring in a nitrogen atmosphere with 1,000 milliliters of a 1 molar solution of $TiCl_2(O\text{-}isoC_3H_7)_2$. The precipitate was washed by decanting and stirring 10 times, each time with 500 milliliters of cyclohexane until the cyclohexane above the precipitate was free from titanium compound. The volume of the suspension was made up to 1,000 ml.

The titanium content of the suspension was determined colorimetrically with hydrogen peroxide.

II. Polymerization of Ethylene a. 100 Liters of Diesel oil having a boiling point in the range of from 140° to 200° C were introduced into a 150 liter vessel, the air in the vessel was replaced by pure nitrogen and the Diesel oil was heated at 80°–85° C. A solution of 41.5 grams (300 millimoles) of aluminum-triethyl in 500 ml of Diesel oil and 120 milliliters of the catalyst suspension obtained as described above were added. The polymerization was carried out as 85° C. 6 Kilograms of ethylene were introduced per hour together with hydrogen in such an amount that the proportion thereof in the gaseous phase amounted to 30 % by volume. During the course of polymerization the pressure rose to about 7 atmospheres. After 7 hours the polyethylene formed was separated from the dispersion medium by filtration and dried. 42 Kilograms of polyethylene having a reduced specific viscosity of 1.7, determined with a 0.1 % solution in decahydronaphthalene at 135° C, were obtained. The yield of polyethylene was about 3.5 kilograms per gram of magnesium compound containing hydroxyl groups and sulfate groups.

The polyethylene obtained had a very narrow distribution of molecular weight (Mw/Mn = 3.9) determined as defined above. It had excellent color and corrosion values and was well suitable for injection moulding.

EXAMPLE 13

Copolymerization of Ethylene/Butene 100 liters of Diesel oil having a boiling point in the range of from 140° to 200° C were introduced into a 150 liter vessel, the air in the vessel was replaced by pure nitrogen and the Diesel oil was heated at 80° to 85° C. A solution of 79.2 grams (400 millimoles) of aluminum-triisobutyl in 500 milliliters of Diesel oil and 110 milliliters of the catalyst suspension obtained as described in Example 12 were added. The polymerization was carried out at a temperature of 85° C. 6 Kilograms of ethylene and 180 grams of butene-(1) were introduced per hour together with hydrogen in an amount such that the gaseous phase contained 25 % by volume thereof. During the course of polymerization the pressure rose to about 7 atmospheres. After 7 hours the ethylene/butene copolymer was separated from the dispersion medium by filtration and dried. About 43 kilograms of copolymer were obtained having a reduced specific viscosity of 2.2, determined with a 0.1 % solution in decahydronaphthalene at 135° C, and a density of 0.932 g/cc. The product had excellent color and corrosion values. About 3.9 kilograms of copolymer were obtained per gram of magnesium compound containing hydroxyl and sulfate groups.

EXAMPLE 14

I. Preparation of Catalyst a. 246 grams of $MgSO_4 \cdot 7 H_2O$ were dissolved in 600 milliliters of water and mixed while stirring in portions with 125 grams of MgO. The initially plastic mass solidified after several hours. The magnesium oxide sulfate cement obtained was dried at 120° C and finely ground. The ground reaction product was then heated at 220° C.

b. 150 Grams of the magnesium oxide sulfate cement thus treated were boiled for 15 hours with reflux while stirring in a nitrogen atmosphere with 2,000 milliliters of a 1.5 molar solution of $TiCl_2(O\text{-}isoC_3H_7)_2$ in cyclohexane. The precipitate was then washed by decanting and stirring 15 times, each time with 1,000 milliliters of cyclohexane until the cyclohexane above the precipitate was free from titanium compound. The volume of the suspension was made up to 2,000 milliliters. The titanium content of the suspension was determined colorimetrically with hydrogen peroxide. 5 Milliliters of suspension contained 0.8 millimole of titanium compound.

II. Polymerization of Ethylene

100 Liters of Diesel oil boiling at a temperature in the range of from 140° to 200° C were introduced into a 150 liter vessel and the air in the vessel was replaced by pure nitrogen. The Diesel oil was then heated at 80°–85° C and a solution of 81 grams (600 millimoles) of aluminum-triethyl in 500 milliliters of Diesel oil and 150 milliliters of the catalyst suspension were added. The polymerization was carried out at 85° C. 6 Kilograms of ethylene were introduced together with hydrogen in an amount such that the gaseous phase contained 35 % by volume thereof. During the course of polymerization the pressure rose to about 7 atmospheres. After 7 hours the polyethylene formed was separated from the dispersion medium by filtration and dried. 42 Kilograms of polyethylene having a reduced specific viscosity of 1.5, determined with a 0.1 % solution in decahydronaphthalene at 135° C were obtained. About 3.8 kilograms of polymer were obtained per gram of magnesium oxide sulfate cement. The polyethylene had a very narrow molecular weight distribution (Mw/Mn = 3.4), excellent color and corrosion properties and good properties for injection moulding.

EXAMPLE 15 a. Reaction of the Catalyst with Ethyl-aluminum Sesquichloride.

With the exclusion of air and moisture a solution of 50 millimoles of $Al_2(C_2H_5)_3Cl_3$ (12.4 grams) in 250 milliliters of Diesel oil was dropped at 0° C over a period of 2 hours to 100 milliliters of the catalyst suspension obtained as described in Example 12 and the mixture was stirred for a further 2 hours at 20° C. A bluish black precipitate was formed which was washed 4 times, each time with 300 milliliters of Diesel oil. The volume of the suspension was made up to 100 milliliters b. Polymerization of Ethylene/Propylene 100 Liters of Diesel oil boiling at a temperature in the range of from 140° to 200° C were introduced into a vessel having a capacity of 150 liters, the air in the vessel was replaced by pure nitrogen and the Diesel oil was heated at 80° to 85° C. A solution of 54 grams (400 millimoles) of aluminum-triethyl in 500 milliliters of Diesel oil and 40 milliliters of the suspension of the reduced catalyst were added. The polymerization was carried out at 85° C. 6 Kilograms of ethylene and 150 grams of propylene were introduced together with hydrogen in an amount such that the gaseous phase contained 20 % by volume thereof. During the course of polymerization the pressure rose to about 7 atmospheres. After 7 hours the polyethylene formed was separated from the dispersion medium by filtration and dried. About 43 kilograms of an ethylene/propylene copolymer having a reduced specific viscosity of 3.4, determined with a 0.1 % solution in decahydronaphthalene at 135° C, and a density of 0.936 g/cc were obtained. The polymer had excellent color and corrosion values.

EXAMPLE 16

Polymerization in the Gaseous Phase

A horizontal reactor having a capacity of 10 liters, provided with stirrer the stirring means of which scraped along the inner wall was charged with 500 grams of polyethylene having a reduced specific viscosity of 2.7 and an apparent density of 450 g/l. The reactor was freed from air by repeatedly evacuating and scavenging for several hours with a mixture of ethylene and hydrogen, and heated at 85° C. 5.7 Grams (50 millimoles) of $Al(C_2H_5)_3$ and 12 milliliters of the catalyst suspension of Example 14 were then added. 400 Grams of ethylene were introduced per hour together with hydrogen in such an amount that during polymerization the proportion thereof amounted to 15 % by volume. During the course of polymerization the pressure rose to about 9 atmospheres. After 12 hours about 5.2 kilograms of polyethylene were obtained having a reduced specific viscosity of 3.2, determined with a 0.1 % solution in decahydronaphthalene at 135° C.

EXAMPLE 17 a. Preparation of Catalyst 214.5 grams of $Mg(CH_3COO)_2 \cdot 4 H_2O$ were dissolved in 200 milliliters of water and stirred in portions with 200 grams of MgO. The initially plastic mass solidified after several hours. It was dried at 100° C and finely ground. The ground reaction product was then heated for 20 hours at 135° C.

120 Grams of the magnesium compound heated at 135° C were boiled for 10 hours with reflux while stirring in a nitrogen atmosphere with 1200 milliliters of a 1 molar solution of $TiCl_2(O-isoC_3H_7)_2$ in cyclohexane. The precipitate was then washed by decanting and stirring 10 times, each time with 500 milliliters of cyclohexane until the cyclohexane above the precipitate was free from titanium compound. The volume of the suspension was made up to 1,200 milliliters.

The titanium content of the suspension was determined colorimetrically with hydrogen peroxide. 10 Milliliters of suspension contain 3.2 milligram-atom Ti.

b. Polymerization of Ethylene

100 Liters of Diesel oil boiling at a temperature in the range of from 140° to 200° C were introduced into a 150 liter vessel, the air in the vessel was replaced by pure nitrogen and the Diesel oil was heated at 80° to 85° C. Next, a solution of 34.4 grams (400 millimoles) diethyl-aluminum hydride in 500 milliliters of Diesel oil and 60 milliliters of the above catalyst suspension were added. The polymerization was carried out at 85° C. 5 Kilograms of ethylene were introduced per hour together with hydrogen in an amount such that the proportion thereof in the gaseous phase amounted to 25 % by volume. During the course of polymerization the pressure rose to about 8 atmospheres. After 8 hours the polyethylene formed was separated from the dispersion medium by filtration and dried. About 40 kilograms of polyethylene having a reduced specific viscosity of 2.35, determined with a 0.1 % solution in decahydronaphthalene at 135° C were obtained. The polymer had excellent color and corrosion values. About 6.5 kilograms of polyethylene were obtained per gram of magnesium compound containing hydroxyl groups and acetate groups.

The polyethylene obtained had a very narrow molecular weight distribution (Mw/Mn = 3.9) determined as described above.

EXAMPLE 18 a. Preparation of the Catalyst

115 Grams of $Mg(OH)_2$ were added while stirring to 200 milliliters of aqueous propionic acid of 39 % strength by weight and the reaction product was evaporated to dryness on the water bath, dried at 100° C in a drying cabinet and finely ground. Next, the ground reaction product was heated for 20 hours at 140° C.

100 Grams of the magnesium compound thus obtained were stirred for 15 hours at 80° C in a nitrogen atmosphere with 1000 milliliters of a 1 molar solution of $TiCl_2(O-isoC_3H_7)_2$ in n-decane. The precipitate was then washed by decanting and stirring 10 times, each time with 500 milliliters of n-decane of 60° C until the n-decane above the solid was free from titanium compound. The volume of the suspension was made up to 1000 milliliters and the titanium content was determined colorimetrically with hydrogen peroxide. 10 milliliters of suspension contained 2.7 Ethylene/Butene of Ti.

b. Copolymerization of ethylene/butene

100 Liters of Diesel oil boiling at a temperature in the range of from 140° to 200° C were introduced into a vessel having a capacity of 150 liters, the air in the vessel was replaced by pure nitrogen and the Diesel oil was heated at 80° to 85° C. A solution of 79.2 grams (400 millimoles) of aluminum-triisobutyl in 500 milliliters of Diesel oil and 70 ml of the above catalyst suspension were then added. The polymerization was carried out at 85° C. 6 Kilograms of ethylene and 180 grams of butene-(1) were introduced per hour together with hydrogen in an amount such that the gaseous phase contained 15 % by volume thereof. During the course of polymerization the pressure rose to about 7 atmospheres. After 7 hours the ethylene/butene copolymer was separated from the dispersion medium by filtration and dried. About 43 kilograms of copolymer having a reduced specific viscosity of 3.1, determined with a 0.1 % solution in decahydronaphthalene at 135° C and a density of 0.931 g/cc were obtained. The polymer had excellent color and corrosion values.

About 7.1 kilograms of copolymer were obtained per gram of magnesium compound containing hydroxyl groups and propionate groups.

EXAMPLE 19 a. Preparation of Catalyst

175 Grams of $Mg(OH)_2$ were added while stirring to a suspension of 90 grams of oxalic acid in 400 milliliters of water. The reaction mixture was evaporated to dryness on a water bath, the white mass was dried at 100° C in a drying cabinet and finely ground. The ground magnesium compound was then heated for 20 hours at 150° C.

100 Grams of the magnesium compound thus obtained were boiled for 7 hours with reflux while stirring in an atmosphere of pure nitrogen with 100 milliliters of a 1 molar solution of $TiCl_2(O-isoC_3H_7)_2$ in cyclohexane. The precipitate was washed by decanting and stirring 10 times, each time with 500 milliliters of cyclohexane until the cyclohexane above the solid was free from titanium compound. The volume of the suspension was made up to 1,000 milliliters. The titanium content of the suspension was determined colorimetrically with hydrogen peroxide as described above. 10 milliliters of suspension contained 3.1 milligram-atom of Ti.

b. Polymerization of Ethylene in the Gaseous Phase

A horizontal reactor having a capacity of 10 liters and being provided with a stirrer the stirring means of which scraped along the inner wall was charged with 500 grams of polyethylene having a reduced specific viscosity of 1.5 and an apparent density of 450 g/l. The air in the reactor was removed by repeatedly evacuating and scavenging for several hours with a mixture of ethylene and hydrogen. The reactor was then heated at 83° C and 5.7 grams of $Al(C_2H_5)_3$ (50 millimoles) and 15 milliliters of the catalyst suspension were added. Into the reactor 400 grams of ethylene were introduced per hour together with hydrogen in such an amount that during polymerization the proportion thereof amounted to 30 % by volume. During the course of polymerization the pressure rose to about 9 atmospheres. The polymerization was interrupted after 12 hours. About 5.2 kilograms of polyethylene having a reduced specific viscosity of 1.8, determined in a 0.1 % solution in decahydronaphthalene at 135° C, were obtained, corresponding to about 1.5 kilograms of polymer per gram of magnesium compound containing hydroxyl groups and oxalate groups.

What is claimed is:

1. In the process of polymerizing ethylene or mixtures of ethylene with up to 10% by weight of α-olefins of the formula R—CH = CH$_2$, in which R is a branched or straight-chain hydrocarbon radical having one to 13 carbon atoms, in solution, in suspension or in the gaseous phase at temperatures from 20° to 120° C., under pressures of up to 20 atmospheres, in the presence of a mixed catalyst comprising a titanium-containing component (component A) and an organo-aluminum-compound (component B), the improvement which comprises using as component A of the mixed catalyst the reaction product of $TiCl_2(O-iC_3H_7)_2$ with a hydroxyl-containing halogen-free magnesium compound selected from the group consisting of $Mg(OH)_2$ and magnesium compounds containing besides the hydroxyl group only carbonate, sulfate or carboxylate groups, said carboxylate groups derived by salt formation from carboxylic acids having the formula RCOOH in which R stands for a branched or straight-chain alkyl or aralkyl radical having one to 10 carbon atoms or an aryl radical, or HOOC-R-COOH in which R is an alkyl radical having one to 10 carbon atoms, which magnesium compounds contain 0.1 to 2 moles of hydroxyl groups per gram atom magnesium.

2. The process of claim 1 wherein $Mg(OH)_2$ is the hydroxyl containing magnesium compound.

3. The process of claim 1 wherein hydroxyl containing magnesium carbonates, magnesium sulfates or magnesium carboxylates are used as hydroxyl containing magnesium compounds.

4. The process of claim 1 wherein aluminum trialkyls of the formula $Al(R)_3$ or dialkyl-aluminum hydrides of the formula $Al(R_2)H$ in which R stands for identical or different hydrocarbon radicals having one to 16 carbon atoms are used as organo-aluminum compounds.

5. The process of claim 1 wherein component A contains 0.05 to 10 millimoles of titanium per gram.

6. The process of claim 1 wherein component A is prepared by reacting the magnesium and titanium compounds at a temperature in the range of from 20° to 120° C in an inert diluent.

7. The process of claim 1 wherein ethylene is copolymerized with propylene, butene-(1) or 4-methyl-pentene-(1).

8. The process of claim 1 wherein the molecular weight of the resulting polymer is regulated by means of hydrogen.

* * * * *